(12) United States Patent
Farah et al.

(10) Patent No.: US 8,004,402 B2
(45) Date of Patent: *Aug. 23, 2011

(54) METHOD AND APPARATUS FOR DETERMINING A PHYSICAL LOCATION OF A CUSTOMER

(75) Inventors: Jeffrey Farah, North Brunswick, NJ (US); Richard Palazzo, Phillipsburg, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,763

(22) Filed: Dec. 4, 2009

(65) Prior Publication Data

US 2010/0079277 A1 Apr. 1, 2010

Related U.S. Application Data

(63) Continuation of application No. 11/781,567, filed on Jul. 23, 2007, now Pat. No. 7,629,882.

(51) Int. Cl.
*G08B 1/08* (2006.01)

(52) U.S. Cl. .............................. 340/539.13; 455/414.2
(58) Field of Classification Search ............ 340/539.13, 340/539.11; 455/404.1, 414.2, 414.4
See application file for complete search history.

(56) References Cited

U.S. PATENT DOCUMENTS

| | | | |
|---|---|---|---|
| 5,917,887 A * | 6/1999 | Fesler et al. ............... | 455/166.2 |
| 7,515,036 B2 * | 4/2009 | McClenny et al. ...... | 340/539.13 |
| 7,629,882 B2 | 12/2009 | Farah et al. | |
| 2007/0022032 A1 * | 1/2007 | Anderson et al. ............... | 705/35 |
| 2007/0238448 A1 * | 10/2007 | Gallagher et al. ......... | 455/414.2 |

* cited by examiner

*Primary Examiner* — John A Tweel, Jr.

(57) ABSTRACT

A method and apparatus for determining a physical location of a customer of a network service, e.g., a Voice over Internet Protocol (VoIP) service are disclosed. For example, the method receives a Session Initiation Protocol (SIP) message containing a geographical coordinate data from a Customer Premise Equipment (CPE) device being used by a customer for accessing one or more services. The method retrieves the geographical coordinate data from the SIP message and provides the one or more services to the customer using the geographical coordinate data. In an alternate embodiment, a method and apparatus for sending physical location information are disclosed.

20 Claims, 4 Drawing Sheets

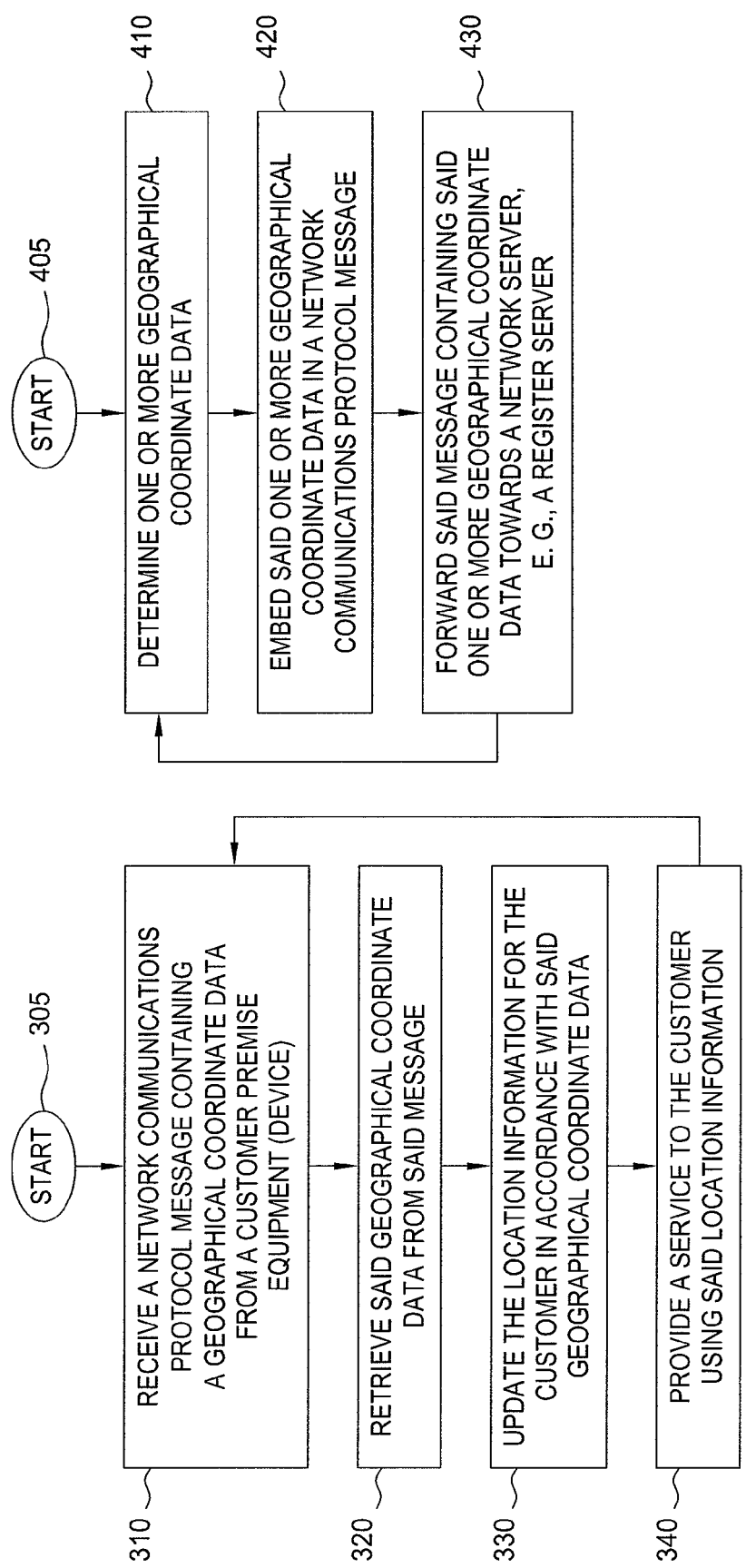

METHOD AND APPARATUS FOR DETERMINING A PHYSICAL LOCATION OF A CUSTOMER

This application is a continuation of U.S. patent application Ser. No. 11/781,567, filed Jul. 23, 2007, now U.S. Pat. No. 7,629,882, and herein incorporated by reference in its entirety.

The present invention relates generally to communication networks and, more particularly, to a method for determining a physical location of a customer of a network service, e.g., a Voice over Internet Protocol (VoIP) service.

BACKGROUND OF THE INVENTION

A network service provider may store a service address for a customer in a database when the customer initially subscribes to the service. For example, a VoIP service provider may store addresses of VoIP customers in a database. In order to ensure that customers of VoIP service are able to access emergency services, the Federal Communications Commission (FCC) mandates VoIP services to be provided only at a location where E911 calls are supported (E911 services). For example, service providers may restrict access to the VoIP service only to the known service address of a customer. For example, if a customer has a VoIP service at home, a VoIP operator may suspend the customer's access to the VoIP service when he/she attempts to access the service from another location.

SUMMARY OF THE INVENTION

In one embodiment, the present invention discloses a method and apparatus for determining a physical location of a customer of a network service, e.g., a Voice over Internet Protocol (VoIP) service. For example, the method receives a Session Initiation Protocol (SIP) message containing a geographical coordinate data from a Customer Premise Equipment (CPE) device being used by a customer for accessing one or more services. The method retrieves the geographical coordinate data from the SIP message and provides the one or more services to the customer using the geographical coordinate data.

In an alternate embodiment, the present invention discloses a method and apparatus for sending physical location information. For example, the method determines geographical coordinate data for a Customer Premise Equipment (CPE) device. The method then inserts the geographical coordinate data into a Session Initiation Protocol (SIP) message and forwards the SIP message to a service provider.

BRIEF DESCRIPTION OF THE DRAWINGS

The teaching of the present invention can be readily understood by considering the following detailed description in conjunction with the accompanying drawings, in which:

FIG. 3 illustrates a flowchart of one embodiment of a method for determining the physical location of a customer;

FIG. 4 illustrates a flowchart of one embodiment of a method for sending the physical location information of a caller by a CPE device.

To facilitate understanding, identical reference numerals have been used, where possible, to designate identical elements that are common to the figures.

DETAILED DESCRIPTION

The present invention broadly discloses a method and apparatus for determining the physical location of a caller in a network, e.g., a Voice over Internet Protocol (VoIP) network. Although the present invention is discussed below in the context of VoIP services, the present invention is not so limited. Namely, the present invention can be applied for any other services using Session Initiation Protocol (SIP) signaling.

Figure 1:
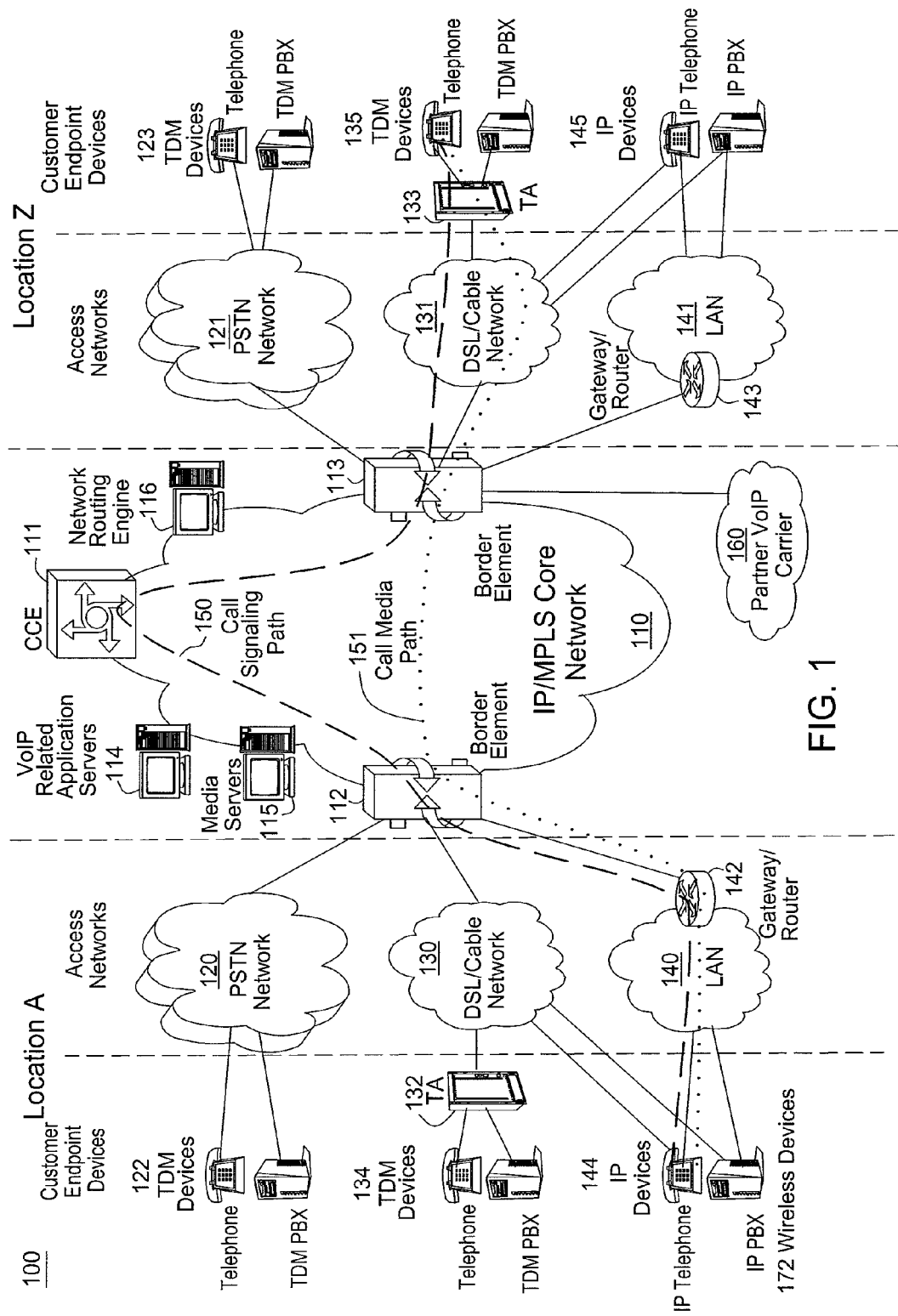
FIG. 1 illustrates an exemplary network related to the present invention.

To better understand the present invention, FIG. 1 illustrates an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (e.g., a service provider) VoIP core infrastructure over an Internet Protocol/Multi-Protocol Label Switching (IP/MPLS) based core backbone network. Broadly defined, a VoIP network is a network that is capable of carrying voice signals as data packets over an IP network. The present invention is described below in the context of an illustrative VoIP network. Thus, the present invention should not be interpreted as limited by this particular illustrative architecture.

The customer endpoint devices can be Time Division Multiplexing (TDM) based or IP based. For example, TDM based customer endpoint devices 122, 123, 134, and 135 may comprise TDM phones or Private Branch Exchanges (PBXs). IP based customer endpoint devices 144 and 145 may comprise IP phones or IP PBXs. In one embodiment, the Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices may access VoIP services by using either a Public Switched Telephone Network (PSTN) 120, 121 or a broadband access network 130, 131 via the TA 132 or 133. IP based customer endpoint devices may access VoIP services by using either a Local Area Network (LAN) 140, 141 or a broadband access network 130 and 131. The LANs 140 and 141 may have VoIP gateway routers 142 and 143, respectively.

The access networks can be either TDM or packet based. For example, a PSTN 120 or 121 is a TDM based access network used to support TDM customer endpoint devices connected via traditional phone lines. A packet based access network, such as Frame Relay, ATM, Ethernet or IP, is used to support IP based customer endpoint devices via a customer LAN, e.g. LANs 140 and 141. A packet based broadband access network 130 or 131, such as DSL or Cable, may be used to support IP devices such as 144 and 145, as well as to support TDM based customer endpoint devices such as 134 and 135 when used with a TA 132 or 133.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE can be implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE can be implemented as a Media Gateway Controller or a soft-switch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g., translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140 and the VoIP Gateway/Router 142 to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup between two endpoint devices, the CCE 111 does not need to be in the data path for actual direct data exchange.

Media Servers (MS) 115 are special servers that may handle and terminate media streams, and to provide services such as announcements, bridges, trans-coding, and Interactive Voice Response (IVR) messages for VoIP service applications. The media servers may also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported on networks, such as VoIP networks. When a customer subscribes to a VoIP service, the service provider associates the request (service subscription) with the customer's telephone number and device (e.g., a terminal adaptor or a router). For example, when a customer initiates a VoIP session, the VoIP service provider associates the received request with the telephone number assigned to the customer. One of the concerns customers have about relying on the IP based services for all voice and data services is the fact that some services need to be delivered based on the physical location of the user, but the call may be originated from any location with an Internet access. For example, calls for emergency services, e.g., to a fire department, a police station, etc. are intended to be received by a Public Safety Answering Point (PSAP) that serves the caller's present location. PSAP serving area boundaries are defined by local 911 authorities (e.g., city and county governments, etc.). In order to clearly illustrate the teachings of the current invention, the following terminologies will first be described:

911 call;
911 tandem;
Public Safety Answering Point (PSAP); and
Enhanced 911 (E911).

A 911 call refers to a telephone call placed for the purpose of requesting emergency services. The public switched telephone network has been enabled to recognize specific telephone numbers as a call for emergency services. The universal emergency telephone number used in North America is 911. The emergency call is delivered based on geographical location of the caller to a public safety answering point as defined below.

A 911 tandem refers to a switch that is used to connect telephone switching centers to the various public safety answering points. For example, when a wireless caller dials 911, the call is routed to a mobile switching center. The mobile switching center is connected to the 911 tandem that determines the public safety answering point that can best service the call and then routes the call accordingly.

Public Safety Answering Point (PSAP) refers to a location where emergency calls are received and distributed to the appropriate emergency service providers such as a fire department, a hospital, an ambulance service dispatcher, a police dispatcher, etc. The services that belong in a particular PSAP vary by community. The Incumbent Local Exchange Carrier (ILEC) manages the telephone equipment such as the 911 tandem that routes the call to the appropriate public safety answering point.

Enhanced 911 (E911) refers to an enhancement of technology that routes emergency calls (i.e., 911 calls) to the PSAP that has been designated to serve the caller's location, and delivers the caller's call back number (Automatic Number Identification (ANI)) and location (Automatic Location Identification (ALI)).

Enhanced 911 calls can be delivered over a dedicated E911 network to a Public Safety Answering Point (PSAP). In one embodiment, the dedicated E911 network is contained within a traditional PSTN network. However, it should be noted that a PSAP may support IP in the future. Generally, the emergency calls are delivered based on the geographical location of the caller to the PSAP designated to serve that location. Regardless of the network used to initiate the 911 call, the 911 calls will eventually be sent to the proper PSAP.

In one embodiment, a VoIP service provider may store a service address for a VoIP customer in a database when the customer initially subscribes to the VoIP service and may provide a method for a PSAP to access the database. For example, the VoIP service provider may store the address in a database and provides an index that may be used to locate the address. When the customer initiates an emergency call, e.g., a 911 call, from the service address, the VoIP service provider may identify the caller, retrieve the caller's phone number, and forward the phone number to the 911 tandem that is located in the PSTN network. The VoIP service provider may also send the index that may be used to locate the customer's service address. The local exchange carrier with the PSTN network may then deliver the information from the 911 tandem to the proper PSAP. The call and the telephone number flow from the VoIP service provider towards the PSAP. The PSAP may then use the index and the phone number to retrieve the caller's address.

In order to ensure that customers of VoIP service are able to access emergency services, the FCC mandates VoIP services to be provided only at a location where E911 calls are supported (E911 services). For example, service providers may restrict access to the VoIP service only to the known service address of a customer. For example, if a customer has a VoIP service at home, a VoIP operator may suspend the customer's access to the VoIP service when he/she attempts to access the service from another location.

In one embodiment, the current invention discloses a method and apparatus for determining a physical location of a customer of a network service, e.g., a VoIP service. The method first enables one or more Customer Premise Equipment (CPE) devices, e.g., TAs, routers, hubs, etc. to determine their own geographical location. For example, the CPE devices may be equipped with the ability to determine satellite based geographical coordinate data, e.g., the United States' Global Positioning System (GPS), Europe's Galileo, Russia's Global Navigation Satellite System (GLONASS), and the like. The CPE device may then include the geographical coordinate data in a SIP message, as defined below. The accuracy of the geographical coordinate data may depend on the particular satellite based system and the capabilities built into the CPE devices. For example, a GPS system may provide a 3-dimensional global positioning data accurate to within a few meters, e.g., within 3 meters. As such, in one embodiment, a SIP message containing GPS coordinate data may then be used to determine a location within 3 meters of the CPE device (e.g., TA, router, hub) that a caller may be using.

A SIP message refers to a request from a client to a server or a response from a server to a client using the Session Initiation Protocol (SIP). In one embodiment, a SIP message contains a start line, one or more header fields, an empty line indicating the end of the header fields, and an optional message body. A SIP message is distinguished as a "request" when the start line is a request line. A request line includes a method name, a request Universal Resource Identifier (URI), a protocol version, a single space character between the method name and URI, a single space character between the URI and protocol version, and a carriage return line feed. The method name may refer to any one of SIP methods defined by standards organizations. Some illustrative examples of SIP methods are:

REGISTER, used for registering contact information such as a caller's current location (e.g., IP address and URI for server close to the customer);

INVITE, used for inviting another caller to a conversation;

ACK, used for acknowledgements that facilitate reliable message exchange between endpoints;

CANCEL, used to terminate a request or a search for a customer;

OPTIONS, used for soliciting information about a server's capabilities;

INFO, used for mid-session signaling; and

BYE, used for terminating a connection between customers or for declining a call.

For example, a SIP message for a request to register the contact information for a customer contains the method name "REGISTER" in the start line. The request is also referred to as a "register request." A register request may be sent by CPE devices to a special type of user agent server called a "registrar." A register request can be sent in support of a SIP discovery capability to enable sessions among callers. More specifically, the discovery capability refers to a process of determining where to send session requests based on knowledge of the location of a customer (e.g., an intended destination IP address and telephone number) and sending the request towards the destination. In order to perform discovery, SIP network elements may consult an abstract service called a "location service." The "location service" provides address bindings for a domain. The address bindings map an incoming SIP message to one or more Uniform Resource Identifiers (URIs) closest to the desired destination. The location service provides the address bindings based on data gathered when the customer registers to receive services via the registrar. Thus, in one embodiment, "registration" refers to a CPE device sending a register request to a registrar. A registrar operates as a front end server to the location service that receives register requests from the CPE devices, and places the information it receives in those requests into a location service for one or more domains it handles.

In one embodiment, the current invention enables a SIP registrar to receive a SIP message containing a geographical coordinate data, e.g., Global Positioning System (GPS) coordinate data, an IP address and/or a telephone number. In one embodiment, the geographical coordinate data may be included as part of one or more SIP header fields. For example, a SIP header field may be modified to include the geographical coordinate data. The CPE device may then populate the header field to include the geographical coordinate data in addition to other header fields, e.g., a header field containing an IP address. The SIP server may then retrieve the geographical coordinate data and IP address from the header fields in a register request, identify the caller, and retrieve the caller's phone number.

In one embodiment, the geographical coordinate data may be included as part of the message body. The message body is an optional part of a SIP message and may also be referred to as "payload." The CPE device may then provide the geographical coordinate data in the message body portion of a register request. The registrar may then read the message body portion of the register request and retrieves the geographical coordinate data for a customer.

The service provider may then use the geographical coordinate data to update the location information for the customer. For example, if the geographical coordinate data is different from the location used in a previous VoIP session, the service provider may update a Location Information Server (LIS) database for the customer. The updated LIS database may be utilized for providing services that are based on physical location of the caller, e.g., E911 services. In this manner, the service provider may provide E911 service at the current physical location of the customer without disruption or suspension of the VoIP service.

For example, if a VoIP customer accesses the VoIP service from a new location, the geographical coordinate data may be used to update an LIS database for the customer. If the customer initiates a 911 call, the VoIP service provider may then identify the caller from the IP address, retrieves the caller's phone number and geographical coordinate data, and forwards the phone number and GPS coordinate data to the 911 tandem that is located in the PSTN network. The VoIP service provider may also send an index that may be used to locate the address corresponding to the geographical coordinate data. The local exchange carrier with the PSTN network delivers the information from the 911 tandem to the proper PSAP. The call, the telephone number, and the geographical coordinate data or the index, flow from the VoIP service provider towards the PSAP. The PSAP may use either the geographical coordinate data or the index that may be used to locate the specific address corresponding to the geographical coordinate data, and the phone number to retrieve the caller's information for providing the emergency service.

Figure 2:
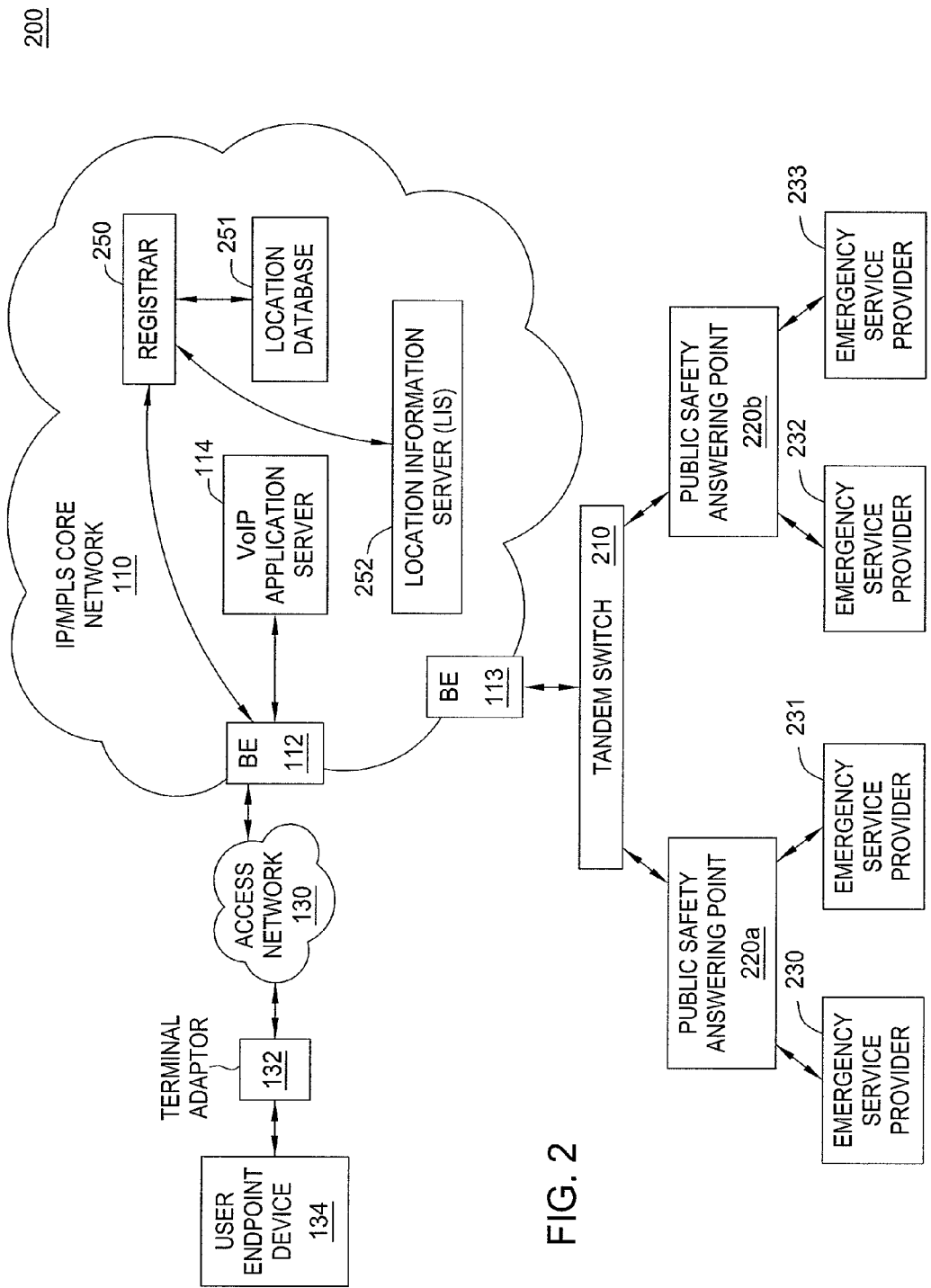
FIG. 2 illustrates an exemplary network with one embodiment of the present invention for determining the physical location of a customer.

FIG. 2 illustrates an exemplary network 200 with one embodiment of the present invention for determining the physical location of a customer. For example, a customer is using a TDM user endpoint device 134 to receive a VoIP service by accessing an IP/MPLS core network 110 via an access network 130. In this example, the TDM user endpoint device 134 is connected to the access network 130 via a TA 132. The access network 130 is connected to the IP/MPLS core network 110 through a border element 112. The IP/MPLS core network 110 contains a registrar 250, a location database 251, a location information server 252, and a VoIP application server 114.

The IP/MPLS core network 110 is also connected to a PSTN access network via a border element 113. The PSTN network is capable of routing 911 calls to a 911 tandem switch 210. In one embodiment, the 911-tandem switch is connected to a plurality of Public Safety Answering Points (PSAPs) 220a and 220b. The 911 tandem switch forwards each 911 call to the closest PSAP based on the physical location of the caller. The public safety answering points 220a and 220b are, in turn, connected to various emergency service providers 230, 231, 232 and 233. Each community will determine the emergency services such as the local police department, ambulance service provider, fire department, and the like to be connected to the PSAP. Thus, a caller using a user endpoint device 134 is able to originate an emergency call that will be routed to a proper PSAP that will be able to service the emergency call.

In one embodiment, the TA 132 may determine its own GPS coordinate data and may send SIP messages containing the GPS coordinate data. For example, when a customer initiates a VoIP session, the TA 132 may send one or more register requests containing the GPS coordinate data.

In one embodiment, the VoIP service provider enables a customer to access the VoIP application server 114 and to subscribe to a VoIP service. The VoIP service provider may record the IP addresses and GPS coordinate data (or addresses corresponding to GPS coordinate data) of customer endpoint devices in the location database 251. For example, the registrar 250 may retrieve the GPS coordinate data from a register request and records the GPS coordinate data in the location database 251. For example, if the CPE device 134 sends a SIP register request to the registrar 250 (via the TA 132 and the access network 130), the registrar 250 reads the GPS coordinate data provided by the TA 132 and determines whether or not the received GPS coordinate data is different from the GPS coordinate data for the customer from the previous session. For example, the received GPS coordinate data may be compared to that retrieved from the location database 251. If the received GPS coordinate data is different from the GPS coordinate data from the previous session, the method then updates the GPS coordinate data for the customer in the location database 251 and the LIS 252. The service provider is then able to provide the VoIP service to the customer at the current physical location, even if the current physical location is different from a service location that is associated with the customer.

In one embodiment, the user endpoint device may be equipped with the capability to determine its own geographical coordinate data. For example, a telephone may be equipped with GPS capability. When a customer accesses the VoIP service with such capability, the CPE may receive the geographical coordinate data from the user endpoint device and forward the received geographical coordinate data in the SIP message. For example, the CPE may determine that the geographical coordinate data received from a user endpoint device is not identical to its own geographical coordinate data. The CPE may then transmit the received geographical coordinate data instead of its own.

In another embodiment, the CPE may send both its own geographical coordinate data and that of the user endpoint device. For example, a CPE may be shared by several user endpoint devices and it may be important to determine the specific location of the user when an emergency call is originated via the CPE. For example, a hotel may have several rooms all sharing a router. When a VoIP customer accesses from a specific room in a hotel, it may be necessary to know the location of the customer as well as the location of the router. For example, the router's location may be used in an index to determine the street address of the hotel, while the location of the user endpoint device may be used in a separate index (as a secondary parameter) to locate the caller.

In one embodiment, the CPE may be configured with a threshold for sending the geographical coordinate data of a user endpoint device. For example, if the user endpoint device is within 10 meters of the CPE device, it may not be useful or necessary to transmit the geographical coordinate data of the user endpoint device.

However, in another example, a customer may dial 911 while walking around his/her neighborhood. In that case, the geographical coordinate data of the user endpoint device may be used to deliver emergency services to the physical location of the caller instead of the location of the router or TA, which will likely be in the home of the customer.

FIG. 3 illustrates a flowchart of one embodiment of a method 300 for determining the physical location of a customer. Method 300 starts in step 305 and proceeds to step 310.

In step 310, method 300 receives a SIP message containing a geographical coordinate data from a Customer Premise Equipment (CPE) device. For example, a SIP registrar receives a SIP message containing a Global Positioning System (GPS) coordinate data, an IP address and/or a telephone number.

In step 320, method 300 retrieves the geographical coordinate data from the SIP message. For example, the SIP registrar may retrieve the geographical coordinate data and IP address from one or more header fields in a register request.

In one alternate embodiment, the geographical coordinate data is received as part of the message body portion of the SIP message. The registrar may then read the message body portion of the register request and obtains the geographical coordinate data for a customer.

In step 330, method 300 updates the location information for the customer in accordance with the geographical coordinate data. For example, the method may use the geographical coordinate data to update the location information for the customer stored in a Location Information Server (LIS) database.

In step 340, method 300 provides a service, e.g., a VoIP service, to the customer using the location information. The method then proceeds back to step 310 to continue receiving SIP messages.

In one embodiment, the method may compare the geographical coordinate data with the geographical coordinate data used by the customer in the last session prior to the current session and performs an update only if the newly received geographical coordinate data is different.

FIG. 4 illustrates a flowchart of one embodiment of a method 400 for sending the physical location information of a customer by a CPE device. Method 400 starts in step 405 and proceeds to step 410.

In step 410, method 400 determines one or more geographical coordinate data. For example, a CPE device may be able to determine its own GPS coordinate data, e.g., using GPS receivers employed in the CPE device. Furthermore, the CPE device may optionally receive geographical coordinate data from a user endpoint device, e.g., via a SIP register request from a user endpoint device that the CPE device services. Thus, method 400 is able to determine geographical coordinate data of the CPE device and/or the geographical coordinate data of the user endpoint device.

In step 420, method 400 embeds the one or more geographical coordinate data in a SIP message. For example, the geographical coordinate data of the CPE device can be inserted into a SIP message. Alternatively, if the geographical coordinate data of the user endpoint device is already present in a SIP message, then the CPE device may then modify the SIP message to include its own geographical location. In one embodiment, the geographical coordinate data is included as part of the SIP header fields. For example, the SIP header fields may be modified to include the geographical coordinate data. Namely, the CPE device may populate the header field(s) to include the geographical coordinate data in addition to other header fields, e.g., IP address and the like. In an alternate embodiment, the geographical coordinate data is included in the SIP message as part of the message body.

In one embodiment, the geographical coordinate data is a geographical coordinate data determined by a user endpoint device and forwarded to the CPE device. For example, a user endpoint device may determine its own location via GPS receivers and sends the data to the CPE device. The CPE device may then optionally use the geographical coordinate data received from the user endpoint device in conjunction with, or instead of its own geographical coordinate data.

In one embodiment, the CPE may be configured with a threshold for replacing its own geographical coordinate data with the geographical coordinate data of a user endpoint device. For example, the CPE device is able to determine or calculate a difference between the geographical coordinate data of the user endpoint device and the geographical coordinate data of the CPE. The CPE device may use the geographical coordinate data of the user endpoint device if the calculated difference in geographical coordinate data exceeds the predefined threshold. For example, if the CPE device determines that the user endpoint device is greater than 50 meters in distance from the CPE device, then the geographical coordinate data of the user endpoint device will be inserted into the SIP message instead of the geographical coordinate data of the CPE. One rationale is that since the user endpoint device is at a significant distance from the CPE device, it may be more important that the geographical coordinate data of the user endpoint device be made known to the service provider in the event that emergency service is to be provided to the customer.

In another embodiment, the CPE may include both its own geographical coordinate data and that of the user endpoint device in a SIP message. For example, there may be more than one header field for geographical coordinate data thereby enabling the CPE to insert both its own geographical coordinate data and that of the user endpoint device into the SIP message. One rationale is that although the user endpoint device is not at a significant distance from the CPE device, it may still be important that the geographical coordinate data of the user endpoint device be made known to the service provider in the event that emergency service is to be provided to the customer.

In one alternate embodiment, the CPE device may ignore the geographical coordinate data of the user endpoint device. For example, if the CPE device determines that the user endpoint device is less than 5 meters in distance from the CPE device, then the geographical coordinate data of the user endpoint device will not be inserted into the SIP message. Instead only the geographical coordinate data of the CPE is inserted in the SIP message. One rationale is that since the user endpoint device is at an insignificant distance from the CPE device, it is not important that the geographical coordinate data of the user endpoint device be made known to the service provider in the event that emergency service is to be provided to the customer.

In step 430, method 400 forwards the SIP message containing one or more geographical coordinate data towards a network server, e.g., the register server. The method then returns to step 410.

It should be noted that although not specifically specified, one or more steps of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 and FIG. 4 that recite a determining operation or involve a decision, do not necessarily require that both branches of the determining operation be practiced. In other words, one of the branches of the determining operation can be deemed as an optional step.

Figure 5:
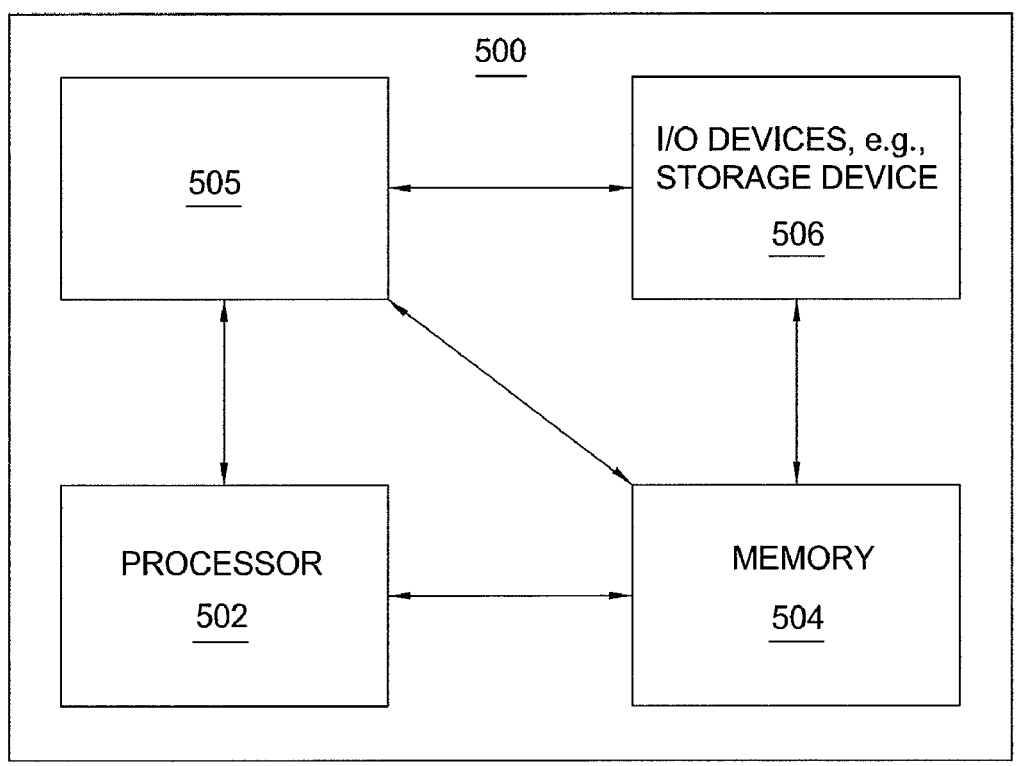
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for determining the physical location of a customer or for sending physical location information of a caller, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for determining the physical location of a customer or for sending physical location information of a caller can be loaded into memory 504 and executed by processor 502 to implement the functions as discussed above. As such, the present method 505 for determining the physical location of a customer or for sending physical location information of a caller (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a physical location of a customer, comprising:
    receiving a signaling message containing geographical coordinate data from a customer premise equipment device being used by a customer for accessing a service;
    retrieving the geographical coordinate data from the signaling message; and
    providing the service to the customer using the geographical coordinate data.

2. The method of claim 1, wherein the geographical coordinate data comprises satellite based geographical coordinate data.

3. The method of claim 1, wherein the geographical coordinate data is retrieved from a header field in the signaling message.

4. The method of claim 1, wherein the geographical coordinate data is retrieved from a message body portion of the signaling message.

5. The method of claim 1, further comprising:
    updating physical location information for the customer in accordance with the geographical coordinate data.

6. The method of claim 5, wherein the updating the physical location information for the customer comprises:
    determining whether the geographical coordinate data is the same as previous geographical coordinate data for the customer; and
    updating a database of a location information server for the customer if the geographical coordinate data of the customer is not the same as the previous geographical coordinate data for the customer.

7. The method of claim 1, wherein the geographical coordinate data is that of the customer premise equipment device.

8. The method of claim 1, wherein the geographical coordinate data is that of a user endpoint device accessing the service via the customer premise equipment device.

9. The method of claim 1, wherein the geographical coordinate data comprises geographical coordinate data of the customer premise equipment device and geographical coordinate data of a user endpoint device accessing the service via the customer premise equipment device.

10. The method of claim 1, wherein the signaling message is received during a registration process.

11. A computer-readable medium having stored thereon a plurality of instructions, the plurality of instructions including instructions which, when executed by a processor, cause the processor to perform a method for determining a physical location of a customer, comprising:
    receiving a signaling message containing geographical coordinate data from a customer premise equipment device being used by a customer for accessing a service;
    retrieving the geographical coordinate data from the signaling message; and
    providing the service to the customer using the geographical coordinate data.

12. The computer-readable medium of claim 11, wherein the geographical coordinate data comprises satellite based geographical coordinate data.

13. The computer-readable medium of claim 11, wherein the geographical coordinate data is retrieved from a header field in the signaling message.

14. The computer-readable medium of claim 11, wherein the geographical coordinate data is retrieved from a message body portion of the signaling message.

15. The computer-readable medium of claim 11, further comprising:
    updating physical location information for the customer in accordance with the geographical coordinate data.

16. The computer-readable medium of claim 11, wherein the updating the physical location information for the customer comprises:
    determining whether the geographical coordinate data is the same as previous geographical coordinate data for the customer; and
    updating a database of a location information server for the customer if the geographical coordinate data of the customer is not the same as the previous geographical coordinate data for the customer.

17. The computer-readable medium of claim 11, wherein said the geographical coordinate data is that of the customer premise equipment device.

18. The computer-readable medium of claim 11, wherein the geographical coordinate data is that of a user endpoint device accessing the service via the customer premise equipment device.

19. The computer-readable medium of claim 11, wherein the geographical coordinate data comprises geographical coordinate data of the customer premise equipment device and geographical coordinate data of a user endpoint device accessing the service via the customer premise equipment device.

20. A method for sending physical location information, comprising:
    determining geographical coordinate data for a customer premise equipment device;
    inserting the geographical coordinate data into a signaling message; and
    forwarding the signaling message to a service provider.

* * * * *